(12) United States Patent
Streuli

(10) Patent No.: US 8,286,308 B2
(45) Date of Patent: Oct. 16, 2012

(54) BAND CLAMP

(75) Inventor: Walter Streuli, CH-Hausen am Albis (CH)

(73) Assignee: Hans Oetiker AG Maschinen-und Apparatefabrik, Horgen (CH)

(*) Notice: Subject to any disclaimer, the term of this patent is extended or adjusted under 35 U.S.C. 154(b) by 679 days.

(21) Appl. No.: 12/300,057

(22) PCT Filed: May 9, 2006

(86) PCT No.: PCT/EP2006/004344
§ 371 (c)(1),
(2), (4) Date: Jan. 14, 2009

(87) PCT Pub. No.: WO2007/128334
PCT Pub. Date: Nov. 15, 2007

(65) Prior Publication Data
US 2009/0235492 A1 Sep. 24, 2009

(51) Int. Cl.
*F16L 33/00* (2006.01)
*F16L 33/025* (2006.01)
(52) U.S. Cl. ........ 24/20 R; 24/19; 24/20 EE; 24/20 CW
(58) Field of Classification Search ............... 24/20 CW, 24/20 EE, 19, 20 R
See application file for complete search history.

(56) References Cited

U.S. PATENT DOCUMENTS

| | | | | |
|---|---|---|---|---|
| 119,844 A * | 10/1871 | Hamlin | .......... | 24/20 EE |
| 157,940 A * | 12/1874 | Smith | .......... | 24/20 EE |
| 548,483 A * | 10/1895 | Vogel | .......... | 24/20 EE |
| 4,430,775 A | 2/1984 | Arthur | | |
| 4,492,004 A * | 1/1985 | Oetiker | .......... | 24/20 R |
| 5,138,747 A | 8/1992 | Oetiker | | |
| 5,305,499 A | 4/1994 | Oetiker | | |
| 5,353,478 A * | 10/1994 | Spors | .......... | 24/20 R |
| 5,537,721 A * | 7/1996 | Oetiker | .......... | 24/20 R |
| 5,740,589 A | 4/1998 | Dominguez | | |
| 6,481,061 B1 * | 11/2002 | Andre et al. | .......... | 24/20 R |
| 7,024,731 B2 * | 4/2006 | Craig, Jr. | .......... | 24/20 CW |
| 2004/0134041 A1 * | 7/2004 | Craig, Jr. | .......... | 24/20 CW |

FOREIGN PATENT DOCUMENTS

EP  0 601 307 A1  6/1994

* cited by examiner

*Primary Examiner* — Robert J Sandy
*Assistant Examiner* — Michael Lee
(74) *Attorney, Agent, or Firm* — Barnes & Thornburg LLP

(57) ABSTRACT

A clamp is formed from a band with overlapping end portions. The clamp includes closing means including an aperture in one of the band end portions and a projection on the other band end portion to engage the aperture in a closed condition of the clamp and hold the mutually overlapping band end portions upon one another. The clamp also includes tightening means for tightening the clamp by reducing the circumferential length from the closed condition and a tightened condition. The clamp has force transmitting means for positively transmitting tensile force between the mutually overlapping band end portions in the tightened condition of the clamp. The force transmitting means includes a first cup-shaped embossment formed in one of the band end portions and a second cup-shaped embossment formed in the other band end portion and adapted to engage the first cup-shaped embossment in the closed condition of the clamp.

9 Claims, 1 Drawing Sheet

US 8,286,308 B2

BAND CLAMP

CROSS-REFERENCE TO RELATED APPLICATION(S)

This is a National Stage U.S. patent application that relies for priority on International Patent Application No. PCT/EP2006/004344, filed on May 9, 2006, the contents of which are incorporated herein by reference.

FIELD OF THE INVENTION

This invention relates to a hose clamp. More specifically, this invention relates to a hose clamp formed from a single band of material.

BACKGROUND

U.S. Pat. No. 5,305,499 discloses a clamp formed from a band. The open clamp, which in the delivery condition is circularly pre-shaped, is placed around the object to be clamped with the two band end portions overlapping one another. For closing the clamp, hooks are provided in the overlapped inner band end portion, which engage apertures provided in the outer band end portion. The clamp is subsequently tightened by narrowing a so-called "Oetiker ear".

The known clamp has three hooks. One of the hooks is a guide hook in the form of a tab bent from the band material to extend through a slot provided in the outer band end portion and extending in the longitudinal direction of the band. The two other hooks are support hooks, stamped out of the inner band end portion by cold deformation, to engage corresponding edges of window-shaped apertures in the outer band end portion. The edge of the guide hook, remote from the inner band end, extends obliquely outward so that, when the clamp is tightened, the mutually overlapping band end portions are guided toward each other and are maintained in a close overlapping relationship.

The tensile forces, which occur between the two band end portions in the tightened condition of the clamp, are transmitted primarily from the two support hooks formed at the inner band end portion onto the edges of the window-shaped apertures formed in the outer band end portion remote from the tightening means. It has been found that, when the tensile forces to be transmitted are increased, material failure will occur at these aperture or window edges.

U.S. Pat. No. 5,138,747 discloses a hose clamp which has an elasticity reserve in the form of an attached spring and an additional means for limiting the force acting on the spring. This limiting means uses a hook that engages the edge of an aperture at the given maximum force.

SUMMARY OF THE INVENTION

The invention provides for a clamp which is formed from a band, i.e., an open clamp, that withstands higher tensile forces than comparable prior-art clamps of the same material and dimension.

In accordance with at least one contemplated embodiment of the invention, force transmitting means are provided in addition to, and separate from, the closing means for positively transmitting the tensile force which acts between the mutually overlapping band end portions in the tightened condition of the clamp. The closing means, which includes an aperture in one of the band end portions and a projection on the other band end portion for engaging the aperture, is thus relieved of transmitted, tensile forces. Unlike the prior art, the (at least one) aperture, which is part of the closing means and which necessarily weakens the band material, is not used for transmitting forces. Tests have shown that the clamp of the invention breaks within the area of the full band width, possibly in the area of the tightening means, but not at the closing means and is, thus, capable to withstand higher forces than prior art devices.

The configuration of the force transmitting means in one contemplated embodiment is desirable because cup-shaped embossments in the band material increase the stability of the material rather than decreasing it.

The at least partially rounded shape of the embossments in one contemplated embodiment avoids stress peaks in the force transmitting area. The shape contemplated for another embodiment is advantageous also from the manufacturing standpoint.

In one contemplated embodiment of the invention, the embossments engage one another with play, which facilitates the closing of the clamp without impairing the force transmission.

The embodiment of the invention defined by still another contemplated embodiment is desirable in so far as the mutually overlapping band end portions are closely held upon one another in the closed condition of the clamp. In combination with other aspects of embodiments of the invention, this has the effect that the two mutually engaging embossments cannot become disengaged even under high tensile forces.

The invention is suitable in connection with the shape of the tightening means discussed and illustrated with respect to selected ones of the embodiments discussed herein.

Other aspects of the invention will be made apparent from the discussion below and from the drawings appended hereto.

BRIEF DESCRIPTION OF THE DRAWINGS

Embodiments of the invention will be described below with reference to the drawings, in which.

DETAILED DESCRIPTION OF EMBODIMENT(S) OF THE INVENTION

Figure 1:
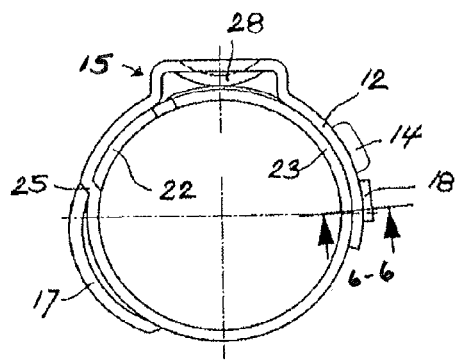
FIG. 1 is a side view of a hose clamp of the invention in the closed but not tightened condition.
Figure 2:
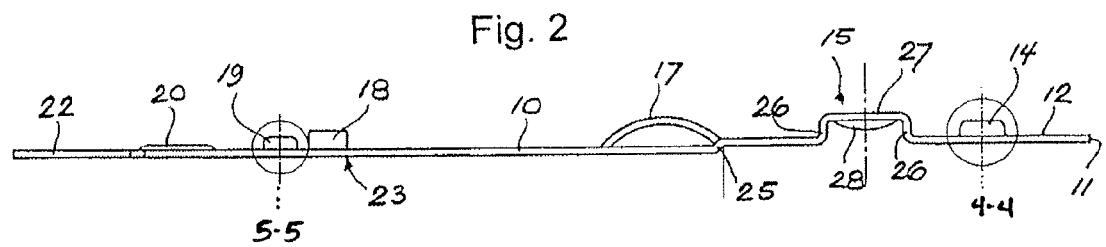
FIG. 2 is a side view of the hose clamp band in the straight, but otherwise completely formed, condition of the clamp.
Figure 3:
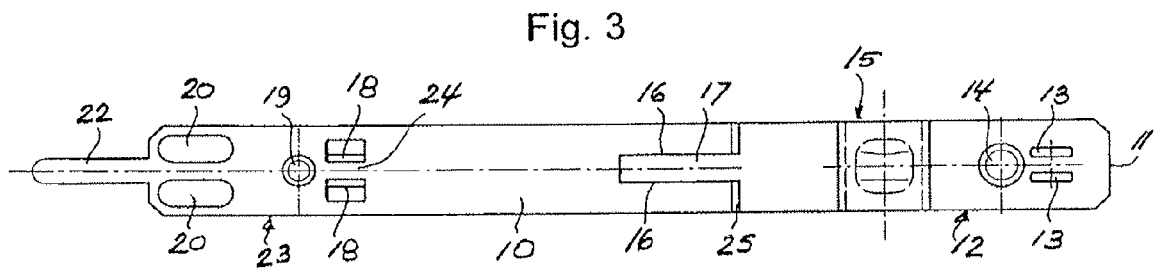
FIG. 3 is a plan view of the clamping band shown in FIG. 2.

The invention will now be described in connection with one or more contemplated embodiments. The embodiment(s) described is(are) not intended to be limiting of the invention. To the contrary, the embodiment(s) is(are) intended to illustrate the scope and breadth of the invention. As should be appreciated by those skilled in the art, numerous variations and equivalents also are contemplated to be encompassed by the scope of the invention.

The hose clamp shown in FIGS. 1-6 is made from a steel band 10 having a width of 8 to 15 mm, typically 10 mm, and a band thickness of 0.6 to 1.0 mm, typically 0.8 mm. Starting from the free end 11 of the band end portion 12, which constitutes the outer band portion in the closed condition of the clamp shown in FIG. 1, the following structures are formed in the band 10: two parallel slots 13 extending in the longitudinal direction of the band 10; a cup-shaped embossment 14; an ear-shaped tightening means 15; a central band portion 17 laterally cut free by two longitudinal cuts 16 and pressed out of the band 10; two tabs 18 cut free on three sides, bent out of the band 10, and extending parallel to the longitudinal direction of the band; a further cup-shaped embossment 19; two guide portions bent out of the band 10 and extending parallel to the longitudinal direction of the band; and a tongue 22 extending from the opposite end 21 of the band 10.

In the closed condition of the clamp shown in FIG. 1, the slots 13 and the first cup-shaped embossment 14 are formed in the outer band end portion 12, whereas the tabs 18 and the second cup-shaped embossment 19 are formed in the inner band end portion 23.

The two cup-shaped embossments 14 and 19, which are formed by deep-drawing the material of the band 10, are essentially inverted-U-shaped structures in the longitudinal section of the band. The embossments 14 and 19 are circular in the plan view, as illustrated. The inner diameter of the embossment 14 provided in the outer band portion 12 is 3.5 to 4.0 mm, typically 3.8 mm, and is larger by 0.2 to 0.4 mm, typically 0.3 mm than the outer diameter of the embossment 19 formed in the inner band end portion 23. Thus, the two embossments 14 and 19 engage one another with play and are, therefore, easily brought into engagement when the clamp is closed.

Figure 6:
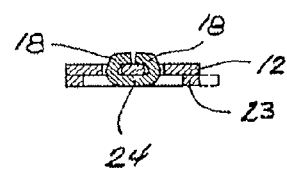
FIG. 6 is a cross-sectional view taken at the location 6-6 in FIG. 1.

In the closed condition of the clamp, the tabs 18 extend through the slots 13 and are folded upon one another on the outer side of the outer band end portion 12, as shown in FIG. 6, so that they substantially completely surround a web 24 of the band 10 that remains between the tabs 18. Since the slots 13 are formed near the free end 11 of the outer band end portion 12, the latter is held tightly on the inner band end portion 23 which, in turn, surrounds the object to be clamped (not shown). As a result, the two cup-shaped embossments 14 and 19 are securely held in mutual engagement.

In the closed condition of the clamp shown in FIG. 1, the free end of the tongue 22 extends into the area of a step 25 formed in the band 10 at a starting point where a slot is formed by the two cuts 16 underneath the pressed-out central band portion 17.

The ear 15, which forms the tightening means, has two leg portions 26 which, in the non-tightened condition of the clamp, extend perpendicularly to the band 10. The ear 15 also includes a bridge portion 27 which connects the outer ends of the leg portions 26 and is reinforced by a depressed bead 28. The depressed bead 28 is guided between the guide regions 20.

For tightening the clamp, the ear 15 is squeezed by a pliers-type tool applied to the feet of the leg portions 26 to reduce the circumferential length of the clamp, whereby the tongue 22 is further moved underneath the pressed-out central band portion 17. The tensile forces, which then are established between the outer band end portion 12 and the inner band end portion 23, act on the mutually engaging cup-shaped embossments 14 and 19 which contact one another in the region of the outer embossment 14, remote from the ear 15. The closed, round shape of the embossments 14 and 19 allows very high forces to be transmitted. On the other hand, the slots 13 through which the tabs 18 of the closing means are guided are left free of tensile forces.

To hold the embossments 14 and 19 in secure engagement, it is useful to arrange them as closely as possible to the closing means formed by the slots 13 and tabs 18. This arrangement will also avoid an unnecessary length of the band.

Since the slots 13 are not exposed to tensile forces, they may terminate close to the free end 11 of the outer band end portion. This also permits a saving in band length.

Figure 4:
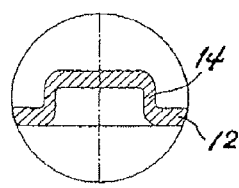
FIG. 4 is an enlarged, cross-sectional view of an embossment provided in the clamping band, the view being taken at the location 4-4 in FIG. 2.
Figure 5:
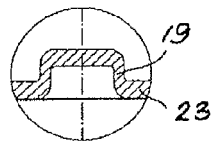
FIG. 5 is an enlarged, cross-sectional view of another embossment provided in the clamping band, the view being taken at the location 5-5 in FIG. 2.

The embossments 14 and 19 do not have to have the circular shape shown in the illustrated embodiment. To avoid peak stresses, it is useful for the embossments 14 and 19 to be rounded at least in the area that, in the outer embossment 14, is remote from the ear 15. In other words, the embossments 14 and 19 should contact one another in their right-hand areas, as shown in FIGS. 4 and 5.

The materials and dimensions given above are mentioned only for illustrating a typical embodiment. The invention is generally applicable to band clamps made of other materials and in other dimensions.

The invention claimed is:

1. A clamp formed of a band and having an outer band end portion which overlaps an inner band portion in the closed condition, comprising:

closing means including an aperture in the outer band end portion and a projection on the inner band end portion to engage the aperture in a closed condition of the clamp and hold the mutually overlapping band end portions upon one another;

tightening means for tightening the clamp by reducing the circumferential length thereof from the closed condition to a tightened condition; and force transmitting means separate from the closing means for positively transmitting tensile force between the mutually overlapping band end portions in the tightened condition of the clamp, wherein the force transmitting means includes a first cup-shaped embossment formed in the inner band end portion and a second cup-shaped embossment formed in the outer band end portion and adapted to receive the first cup-shaped embossment in the closed condition of the clamp, wherein the first and second cup-shaped embossments each have engaging surface portions that extend substantially perpendicularly to a force transmitting direction, wherein the closing means further includes parallel slots formed in the outer band end portion and extending in the longitudinal direction of the band, and corresponding tabs bent out of the inner band end portion and adapted to extend through the corresponding slots and fold towards each other over the outer band end portion disposed between the parallel slots, and wherein, in the tightened condition of the clamp, all tensile forces are transmitted to the first and second cup-shaped embossments and wherein the parallel slots absorb none of the tensile forces.

2. The clamp of claim 1, wherein both cup-shaped embossments are rounded at least in an area which is adjacent the tightening means in an inner one of the embossments and is remote from the tightening means in the other embossment.

3. The clamp of claim 2, wherein both embossments are circular in a cross-section taken parallel to a band surface.

4. The clamp of claim 3, wherein the inner one of the embossments has an outer diameter that is smaller than an inner diameter of the other embossment.

5. The clamp of claim 1, wherein both embossments are deep-drawn from the band forming the clamp.

6. The clamp of claim 1, wherein the force transmitting means is disposed in close proximity to the closing means.

7. The clamp of claim 1, wherein the force transmitting means is disposed on a side of the closing means remote from the free end of that band end portion which is the outer one in the closed condition of the clamp.

8. The clamp of claim 3, wherein the inner diameter of one of the embossments is 3.5 to 4.0 mm and greater by 0.2 to 0.4 mm than the outer diameter of the other embossment, for a band width from 8 to 15 mm and a band thickness from 0.6 to 1.0 mm.

9. The clamp of claim 1, wherein the tightening means includes an ear formed of the band and having two leg portions extending perpendicular to the band in the non-tightened condition of the clamp, and a bridge portion connecting the outer ends of the leg portions.

* * * * *